United States Patent [19]

Melvin, Jr.

[11] 4,032,911

[45] June 28, 1977

[54] SIGNAL REPEATER FOR POWER DISTRIBUTION LINE COMMUNICATION SYSTEMS

[75] Inventor: Waymon A. Melvin, Jr., Raleigh, N.C.

[73] Assignee: Westinghouse Electric Corporation, Pittsburgh, Pa.

[22] Filed: Feb. 26, 1976

[21] Appl. No.: 661,594

[52] U.S. Cl. .................. 340/310 A; 178/58 A; 178/71 N; 325/5; 340/310 R

[51] Int. Cl.² .................................... H04M 11/04

[58] Field of Search ..... 340/310 R, 310 A, 310 CP, 340/147 LP, 155; 179/2.5 R, 170 J, 170.2; 178/58 A, 71 N; 307/241, 243, 239; 325/5; 343/176

[56] References Cited

UNITED STATES PATENTS

| | | | |
|---|---|---|---|
| 2,385,673 | 9/1945 | Woodworth | 340/310 R |
| 3,875,332 | 4/1975 | Fletcher et al. | 178/58 A |
| 3,962,547 | 6/1976 | Pattantyus-Abraham | 340/310 R |
| 3,967,059 | 6/1976 | Moore et al. | 178/58 A |
| 3,973,087 | 8/1976 | Fong | 340/310 R |

Primary Examiner—John W. Caldwell
Assistant Examiner—James J. Groody

Attorney, Agent, or Firm—D. R. Lackey

[57] ABSTRACT

A half-duplex communication repeater for use with power distribution lines. The repeater includes two receivers, two signal generators, a single power amplifier, and a control circuit. The control circuit coordinates the operation of the receivers and the signal generators and prevents the application of the signals from both generators simultaneously to the signal amplifier. The outputs of the two signal generators are applied to transmission gates which are both coupled to the signal amplifier. When an appropriate signal is detected by one receiver, it produces an output signal which is coupled to a latching circuit. The latching circuit turns on the appropriate transmission gate to pass the signal from the corresponding signal generator to the signal amplifier. Due to the operation of the latching circuit, a signal detected simultaneously by the other receiver will not cause the other transmission gate to turn on and apply two signals simultaneously to the signal amplifier. A third transmission gate may be coupled to the common output connections of the other two transmission gates for providing a load on the gate devices to reduce the signal transfer through the gate devices when they are in the turned-off condition.

4 Claims, 2 Drawing Figures

4,032,911

SIGNAL REPEATER FOR POWER DISTRIBUTION LINE COMMUNICATION SYSTEMS

BACKGROUND OF THE INVENTION

1. Field of the Invention:

This invention relates, in general, to power distribution line communication systems and, more specifically, to signal repeaters for communication systems associated with power distribution lines.

2. Description of the Prior Art:

Communication repeaters are used in power distribution line systems to relay communication signals between various points in the distribution system. Uses for such repeaters have included automatic meter reading applications and power line switching applications. Generally, the repeaters are located at positions on the distribution system where the strength of the communication signal is becoming weak and needs to be amplified to maintain a sufficient signal-to-noise ratio. Repeaters are also used at locations where power line components exhibiting a high attenuation for communication signals are connected to the power line system, such as phase angle correcting capacitors and distribution transformers.

Conventional repeaters usually include at least one receiver which detects signals on the distribution line and one transmitter which retransmits these signals to the distribution line after proper amplification. Repeaters are also used in various operating modes, with one of the most frequently used being the half-duplex mode. A half-duplex system permits the transmission of communication signals in both directions along the distribution line system, but only in one direction at a time. Repeaters operating in the half-duplex mode have typically included two transmitters and two receivers, all of which are coupled to the power distribution line. In many applications, the communication signal is translated from one frequency to another. That is, the signal is received at one frequency and translated to another frequency before being applied again to the distribution line.

Repeaters operating in the half-duplex mode are usually controlled by circuitry which senses the reception or detection of a signal having a specific frequency. When the receiver is thus activated, the corresponding transmitter is turned on to retransmit the received signal along the distribution line. Since both transmitters and both receivers are located relatively close to each other on the power distribution line, much of the signal transmitted by one transmitter is necessarily applied to the receiver associated with the other transmitter. Therefore, large and sophisticated filtering networks are needed to filter out the unwanted signals from the operating transmitter in order to prevent the receiver associated with the non-operating transmitter from being activated. Even with large filtering components used in such a system, intermittent operation has been observed due to the detection by both receivers simultaneously of a sufficient signal to activate their associated transmitters. Therefore, it is desirable, and it is an object of this invention, to provide a communication repeater for use on a power distribution line which conveniently and economically prevents the activation of two high power amplifier stages at the same time.

SUMMARY OF THE INVENTION

There is disclosed herein a new and useful communication repeater for power distribution lines which contains circuitry for preventing false or intermittent operation of the repeater components. The repeater includes two receivers, two signal generators, and a communication signal amplifier. These components of the repeater are controlled by a control circuit which includes at least two transmission gates and a latching circuit. The two signal generators are connected, through the transmission gates, to the signal amplifier which is coupled to the distribution line. The transmission gates may be placed in either a turned-on condition in which they will transfer the signals from the generator to the amplifier, or in a turned-off condition in which they prevent the signals from the signal generators from being applied to the signal amplifier. When neither receiver is detecting a signal from the distribution line, the latching circuit is in such a state that the outputs thereof keep both of the transmission gates in the turnedoff condition. Therefore, no signal is applied to the signal amplifier and a control line to the signal amplifier prevents its operation.

When one of the receivers detects an appropriate signal from the power distribution line, the latching circuit is placed in a condition which turns on the transmission gate which is coupled to the signal generator associated with the detecting receiver. Therefore, the signal from the signal generator is applied to the amplifier which is also turned on by the latching circuit. Thus, the received signal causes activation of devices which ultimately produce an amplified signal which is coupled to the power distribution line. Since the latching circuit may change condition only when the detected signal from the activating receiver has been removed, noise signals or other carrier signals from the other receiver will not change the condition state of the latching circuit. Therefore, it is impossible for both generators to be applied to the same signal amplifier simultaneously. With this arrangement, extreme filtering requirements are not necessary at each receiver since, once one signal generator has been connected to the signal amplifier, overloading of the other receiver by the transmitted signal cannot cause the signal generator associated with the other receiver from being coupled to the signal amplifier.

In one specific embodiment of the invention, a third transmission gate is connected between the input line to the signal amplifier and ground potential. This transmission gate is turned on when both of the other two transmission gates are turned off, thereby providing a low impedance load on the output lines of the transmission gates to prevent any signal from reaching the signal amplifier. When one of the signal transmission gates is turned on, the third transmission gate is turned off to remove the low impedance from the signal line entering the signal amplifier.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
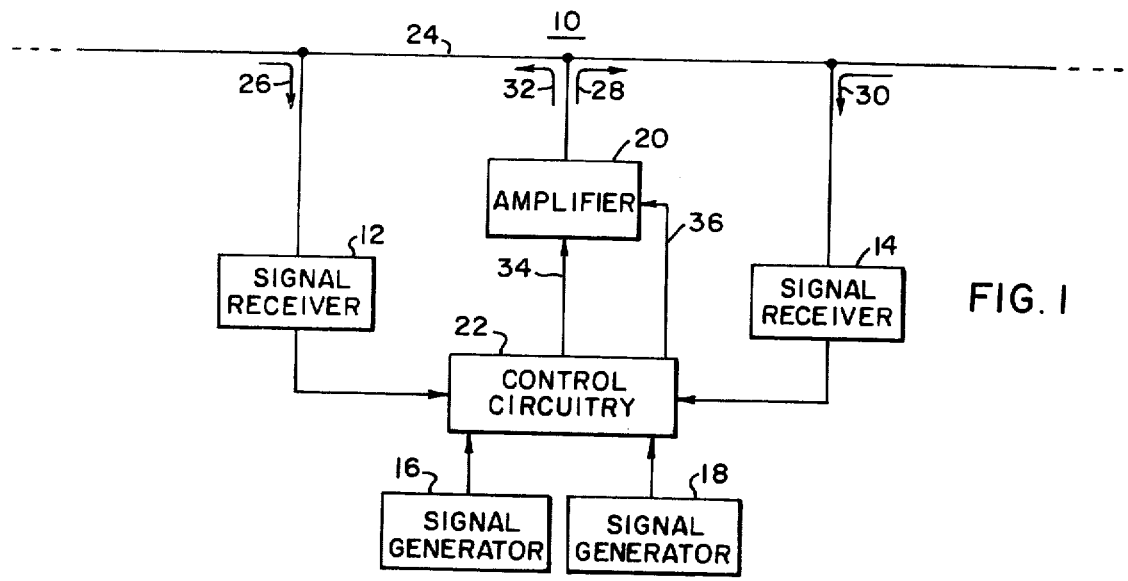
FIG. 1 is a block diagram of a signal repeater constructed according to this invention.

Throughout the following description, similar reference character is refer to similar elements or members in all of the figures of the drawing.

Referring now to the drawing, and to FIG. 1 in particular, there is shown, in block diagram form, a signal repeater constructed according to this invention. The repeater 10 includes signal receivers 12 and 14, signal generators 16 and 18, signal amplifier 20, and control circuitry 22. The signal receivers 12 and 14 are coupled to the power distribution line 24 by suitable means, such as through a capacitor. The repeater 10 may be of the frequency translation type, of the time delay type, or of any other type or arrangement which requires the reamplification and retransmission of signals in two directions along a distribution line.

In a time delay repeater, the retransmitted signal may be on the same carrier frequency as the received signal. In a frequency translation type repeater, the retransmitted signal is on a different frequency than the received signal. Regardless of the type of repeater used, the repeater 10 shown in FIG. 1 operates in the half-duplex mode. That is, signals can only be repeated or translated in one direction at a time along the power distribution line 24. For example, if a signal, represented by arrow 26, is detected from the line 24, the retransmitted signal is applied to the line 24 as represented by the arrow 28 and propagates along the line 24 in the same direction as the signal represented by the arrow 26. Similarly, a received signal, indicated by the arrow 30, is retransmitted in the direction indicated by the arrow 32. However, since the repeater is not capable of simultaneous operation in two directions, transmitted signals represented by arrows 28 and 32 could not exist simultaneously during proper operation of the repeater.

Signals applied to the receiver 12 are detected and converted into a voltage which is applied to the control circuitry 22. Similarly, when the signal receiver 14 detects an appropriate signal from the line 24, a control voltage is applied to the control circuitry 22. The outputs of the signal generators 16 and 18 are applied to the control circuitry 22 as illustrated. Ultimately, an output from one of the signal generators is applied to the signal line 34 which is coupled to the signal amplifier 20. The signal from the appropriate signal generator is applied to the signal amplifier 20 by the control circuitry 22. Which signal is passed by the control circuitry is dependent upon the state of the control voltages applied to the control circuitry 22 by the signal receivers 12 and 14.

The signal generator 16 is associated with the signal receiver 12. Similarly, the signal generator 18 is associated with the signal receiver 14. The frequencies of the associated receivers and generators may be the same if the repeater is operating in the time delay mode. However, when operating in the frequency translation mode, the frequency of the signal generator would be different from the frequency detected by the associated signal receiver. Although not shown in FIG. 1, modulators and demodulators may be associated with the receivers and generators to apply the intelligence conveyed by the detected carrier communication signals to the retransmitted signals.

When a signal is not detected by either the receiver 12 or the receiver 14, the control circuitry prevents any coupling between the signal generators 16 and 18 and the signal line 34 of the amplifier 20. The control circuitry 22 also prevents activation of the amplifier 20 through the control line 36 under these conditions. However, when the signal receiver 12 detects an appropriate signal, the signal generator 16 is coupled to the signal line 34 by the control circuitry 22. At the same time, the control line 36 is activated by the control circuitry 22 to energize or activate the amplifier 20. When the control circuitry has been activated by the receiver 12, any signals detected by the receiver 14 cannot change the state of the control circuitry 22. Thus, it is impossible for the output from the signal generator 18 to be transferred to the amplifier 20. Therefore, the application of two signals to the line 24 cannot be accomplished by the repeater 10 shown in FIG. 1. This feature is important since much of the filtering required by conventional repeaters is not necessary since extraneous noise or signals detected by the standby signal receiver cannot change the control circuitry 22. For example, if some of the transmitted signal indicated by the arrow 28 is applied to the receiver 14 and causes a control voltage to be applied to the control circuitry 22, no change in the control circuitry 22 will occur and thus intermittent operation of the repeater will not take place and the generator 18 will remain isolated from the amplifier 20.

Figure 2:
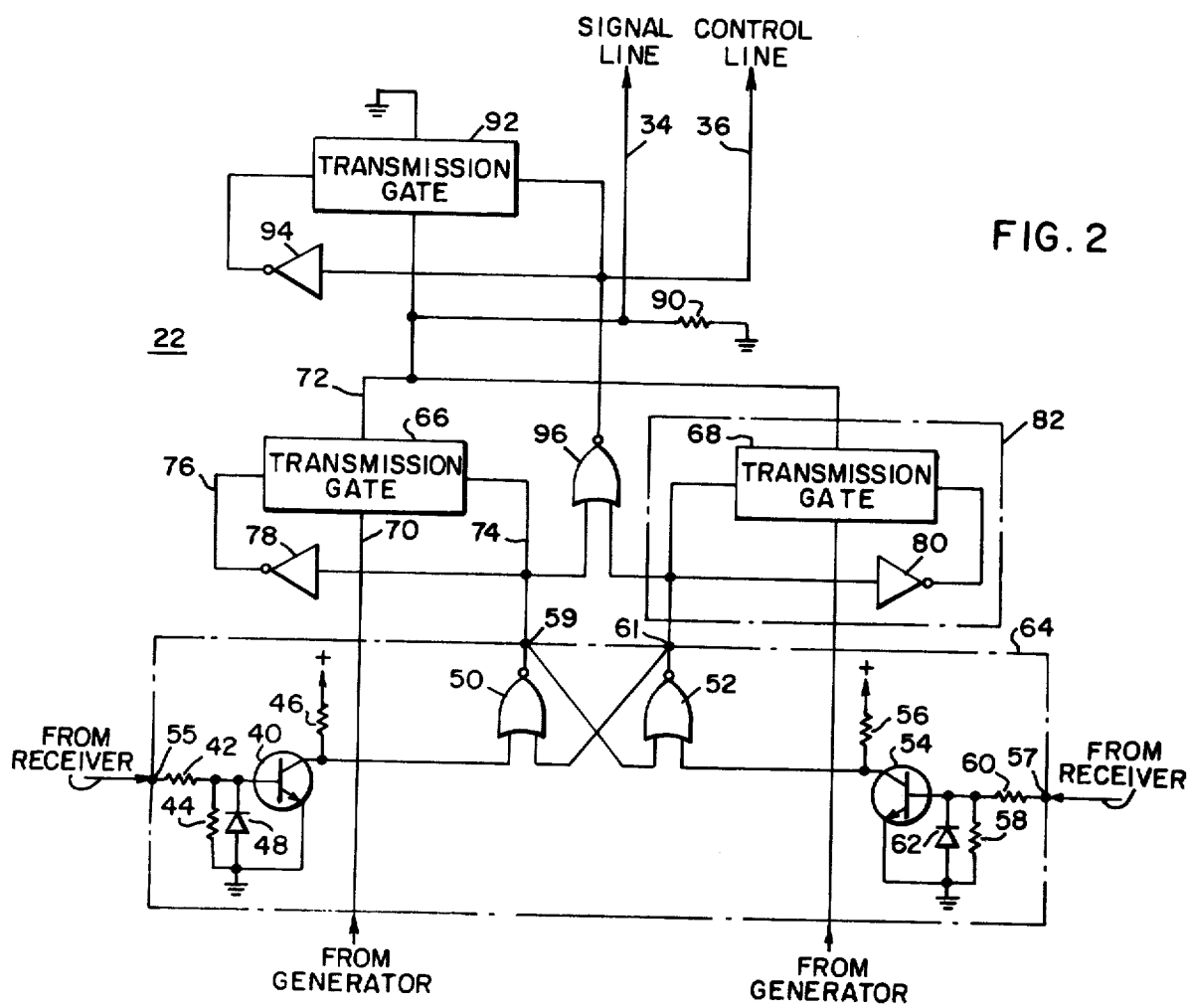
FIG. 2 is a combination block and schematic diagram of the control circuit shown in block form in FIG. 1.

FIG. 2 is a combination schematic and block diagram primarily of the control circuitry 22 shown in FIG. 1. The control voltage from the receiver 12 is applied to the interface network comprising the transistor 40, the resistors 42, 44 and 46, and the diode 48. The resistor 46 is connected to a source of positive potential with respect to ground and thus the collector terminal of the transistor 40 has a positive voltage potential thereon corresponding to a high or "one" logic state when the transistor 40 is not conducting. The transistor 40 does not conduct when the voltage from the receiver which is applied to the resistor 42 is very nearly zero. However, when this applied voltage from the receiver is large enough, the transistor 40 conducts and causes the collector terminal thereof to acquire substantially a ground potential thereon, thereby providing a low or "zero" logic state or level to the NOR gate 50.

The NOR gate 52 has one of its input connections connected to an interface circuit which consists of the transistor 54, the resistors 56, 58 and 60, and the diode 62. The operation of this interface circuit is similar to the interface circuit associated with the transistor 40, which is also associated with the signal receiver 12 as shown in FIG. 1. The two interface circuits and the NOR logic elements or circuits 50 and 52 comprise the latch circuit 64 which controls the transmission properties of the transmission gates 66 and 68. The latch circuit 64 includes the input terminals 55 and 57 and the output terminals 59 and 61.

The transmission gate 66 is connected to the signal generator 16, which is shown in FIG. 1, and the transmission gate 68 is connected to the signal generator 18, which is also shown in FIG. 1. Each transmission gate includes principally four connections for the operation thereof, not including the power supply connections. As shown with respect to the transmission gate 66, a transmission gate includes a signal input line 70, a signal output line 72, a control input line 74, and a control input line 76. The control input lines 74 and 76 must be connected to different logic levels for proper operation. Consequently, the inverter 78 is connected between the two input control lines. Similarly, the inverter 80 is connected between the control lines of the transmission gate 68. A transmission gate with a built-in inverter stage is represented by the bilateral switch 82 which is illustrated in block form around the transmission gate 68 and the inverter 80. The other transmission gates shown in FIG. 2, and their corresponding inverters, could similarly be represented by a block representing a bilateral switch. A suitable bilateral switch providing the desired functions for the circuit of FIG. 2 can be provided by an RCA COS/MOS type CD4066 bilateral switch.

The transmission gate 66 is connected to the output of the NOR logic element 50 and the transmission gate 68 is connected to the output of the NOR logic element 52. When these logic elements both exhibit a low logic level output, both transmission gates are turned off and exhibit a high impedance between their input and output lines. Consequently, no signal is transferred between the signal generators and the output lines of the transmission gates 66 and 68. Therefore, the signal line 34, which extends to the amplifier 20, does not contain any signal voltage from any of the signal generators.

The ability of the high impedance of the transmission gates when they are in the turned-off condition to block the transmission of signal voltage therethrough is enhanced by the low impedance loads connected to the signal line 34. The resistor 90 presents a sufficiently low output resistance to the transmission gates to cause an appreciable voltage drop across the internal impedance of the gates when in the turned-off condition. However, the resistance of the resistor 90 is high enough to prevent excessive signal attenuation when one of the transmission gates is turned on. An "active" low impedance network is provided by the transmission gate 92 and the inverter 94 which are connected to the NOR logic element 96. Since the output line of the transmission gate 92 is connected to ground potential, the transmission gate 92 represents a very low impedance to the signal line 34 when turned on. As will be discussed later herein, the transmission gate 92 is turned on when both of the transmission gates 66 and 68 are turned off. When one of the transmission gates 66 or 68 is turned on, the transmission gate 92 is turned off to effectively reduce or remove its loading upon the signal line 34.

When no signal is applied to the interfaces by the signal receivers 12 and 14, the logic elements 50 and 52 of the latch circuit 64 are in a static condition with the outputs thereof at low logic levels. The inputs to each of the logic elements 50 and 52 which are connected to the corresponding interface circuits are at a high logic level during this same period. When the transmission gates 66 and 68 see a low logic level, they are turned off and transmission of signal voltage from the signal generators to the signal line 34 is effectively prevented. In addition, the low logic levels at the outputs of the NOR logic elements 50 and 52 provide a high logic output at the output of the NOR logic element 96 which turns the transmission gate 92 on and provides the appropriate logic level on the control line 36 to turn the amplifier 20 off.

If signal receiver 12 detects an appropriate signal, the control voltage applied to the interface circuit associated therewith causes the transistor 40 to conduct and a low logic level is applied to one input of the NOR logic element 50. Since the other input of this logic element is already at a low logic level, the output thereof becomes high. This turns on transmission gate 66, turns off transmission gate 92, and turns on the amplifier through the control line 36. Thus, signals from the signal generator 16 are applied to the amplifier 20 and utimately to the distribution line 24.

If any signal is received by the signal receiver 14 after the latch has been set to transfer signals from the signal generator 16, as just described, the transistor 54 will conduct, thereby placing a low logic level on one of the input lines of the NOR logic element 52. However, since the other input line to the logic element 52 is at a high level, no change in the output of the NOR logic element 52 will occur. Thus, the signal from the first receiver, that is receiver 12 in the sequence described, is dominant over the signal from the receiver 14 and the latch circuit will not respond to a signal from the later receiver. Consequently, noise signals from the receiver 14, and signals due to high power frequency components near the desired signal frequency generated by the amplifier 20, will not cause the control circuitry to apply more than one signal to the amplifier 20. The operation of the latching circuit is similar if the signal if first received from the signal receiver 14 before a signal is received from the signal receiver 12.

With the repeater circuitry disclosed herein, positive prevention of more than one signal application to the distribution line 24 can be achieved. In addition, only one signal power amplifier is necessary for both signal generators. It is emphasized that, since numerous changes may be made in the above described apparatus and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A signal repeater suitable for use with power distribution line communication systems, said repeater comprising:

a signal amplifier coupled to a power distribution line, said amplifier having a signal input line;

first and second signal receivers coupled to the distribution line, said first receiver providing a first output signal when receiving a first predetermined signal from the distribution line and said second receiver providing a second output signal when receiving a second predetermined signal from the distribution line;

first and second signal generators;

a bistable latch circuit having first and second input terminals and first and second output terminals; and first and second transmission gates each having signal input, signal output, and control input lines, with the signal input lines of the first and second transmission gates respectively coupled to the first and second signal generators, with the signal output lines of the first and second transmission gates coupled to each other and to the signal input line of the signal amplifier, and with the control input lines of the first and second transmission gates respectively coupled to the first and second output terminals of the latch circuit;

said first and second input terminals of said latch circuit being respectively coupled to the first and second receivers so that a first output signal from the first receiver sets the latch circuit in a condition which turns on the first transmission gate if the latch circuit has not already been set in a condition to turn on the second transmission gate.

2. The signal repeater of claim 1 wherein the latch circuit includes first and second NOR logic circuits each having at least two input terminals and one output terminal, with the output terminal of the first logic circuit connected to an input terminal of the second logic circuit, and with the output terminal of the second logic circuit connected to an input terminal of the first logic circuit.

3. The signal repeater of claim 1 wherein the repeater includes a third transmission gate having signal input, signal output, and control input lines, said signal output line being coupled to ground potential, said signal input line being coupled to the output lines of the first and second transmission gates, and said control input line being coupled to a logic circuit which is connected to turn on the third transmission gate when the first and second transmission gates are both turned off.

4. The signal repeater of claim 1 wherein an impedance element is connected between ground potential and the commmon signal output lines of the first and second transmission gates.

* * * * *